(12) United States Patent
Golden et al.

(10) Patent No.: US 9,910,433 B1
(45) Date of Patent: Mar. 6, 2018

(54) SYSTEM FOR REMOTELY OPERATING A VEHICLE SYSTEM

(71) Applicant: General Electric Company, Schenectady, NY (US)

(72) Inventors: Samuel William Golden, Melbourne, FL (US); Jared Klineman Cooper, Melbourne, FL (US); Scott William Dulmage, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/294,865

(22) Filed: Oct. 17, 2016

(51) Int. Cl.
*B61C 17/12* (2006.01)
*G05D 1/00* (2006.01)

(52) U.S. Cl.
CPC .................. *G05D 1/0022* (2013.01)

(58) Field of Classification Search
CPC ....................................................... B61C 17/12
See application file for complete search history.

(56) References Cited

U.S. PATENT DOCUMENTS

| 6,556,899 | B1 * | 4/2003 | Harvey | G08G 1/123 340/989 |
| 6,681,174 | B1 * | 1/2004 | Harvey | G08G 1/127 340/433 |
| 7,290,037 | B2 * | 10/2007 | Clark | G08C 17/02 709/208 |
| 7,778,746 | B2 * | 8/2010 | McLeod | G07C 5/008 320/109 |
| 8,421,587 | B2 * | 4/2013 | Link | H04L 12/4035 340/5.1 |
| 2009/0207043 | A1 * | 8/2009 | Shaffer | G08G 1/161 340/903 |
| 2011/0128118 | A1 * | 6/2011 | Gilleland | B60R 25/24 340/5.2 |
| 2011/0130905 | A1 * | 6/2011 | Mayer | G07C 5/008 701/22 |
| 2012/0136515 | A1 | 5/2012 | Noffsinger et al. | |
| 2014/0094998 | A1 * | 4/2014 | Cooper | B61L 3/006 701/2 |
| 2014/0277788 | A1 * | 9/2014 | Forbes, Jr. | G05F 1/66 700/286 |
| 2016/0261425 | A1 * | 9/2016 | Horton | G05B 15/02 |
| 2017/0101054 | A1 * | 4/2017 | Dusane | G08G 1/127 |
| 2017/0192426 | A1 * | 7/2017 | Rust | G05D 1/0061 |

* cited by examiner

*Primary Examiner* — Alex C Dunn
(74) *Attorney, Agent, or Firm* — Global Patent Operation; John A. Kramer

(57) ABSTRACT

Systems and methods for remotely operating a vehicle system are provided. A system is provided herein that includes a radio frequency (RF) circuit configured to establish a plurality of bi-directional communication links with a plurality of remote vehicle systems, and a controller circuit communicatively coupled to the RF circuit. The controller circuit is configured to obtain operational data from the plurality of remote vehicle systems, determine operation statuses of the remote vehicle systems based on the operational data relative to one or more predetermined thresholds, display on a display the operation statuses of the plurality of remote vehicle systems, and transmit a control signal along a first bi-directional communication link of the plurality of bi-directional communication links to the first remote vehicle system.

20 Claims, 6 Drawing Sheets

SYSTEM FOR REMOTELY OPERATING A VEHICLE SYSTEM

FIELD

Embodiments of the subject matter disclosed herein relate to remotely operating one or more vehicle systems traversing along corresponding routes based on a trip plan.

BACKGROUND

A vehicle system may include one or more propulsion generating vehicles that may be mechanically or otherwise linked (directly or indirectly) to non-propulsion generating vehicles. The powered and non-powered vehicles of the vehicle system may travel as a group according to a trip plan within a transportation network. The trip plan may include a designated route with speed information indicating a planned or predicted speed of the vehicle system while traveling within the segments of the designated route. Conventional vehicle systems are manned by engineers that operate the vehicle system executing the trip plan. However, regulations limit the amount of time each engineer can operate the vehicle system, which increases costs to operate the conventional vehicle system. For example, sleeping accommodations and/or transportation is required to provide new and/or rotate engineers to re-crew the conventional vehicle system to abide by the regulations.

BRIEF DESCRIPTION

In an embodiment, a system (e.g., a remote control system) includes a radio frequency (RF) circuit configured to establish a plurality of bi-directional communication links with a plurality of remote vehicle systems. Each remote vehicle system is traveling along a corresponding route based on a respective trip plan. The system also includes a controller circuit communicatively coupled to the RF circuit. The controller circuit is configured to obtain operational data from the plurality of remote vehicle systems. The operational data includes sensor measurements representing one or more designated characteristics of the remote vehicle systems. The controller circuit is further configured to determine operation statuses of the remote vehicle systems based on the operational data relative to one or more predetermined thresholds. At least one of the operation statuses represent an alert status of a first remote vehicle system of the plurality of remote vehicle systems. The controller circuit is further configured to display on a display the operation statuses of the plurality of remote vehicle systems, transmit a control signal along a first bi-directional communication link of the plurality of bi-directional communication links to the first remote vehicle system. The control signal is configured to adjust at least one of the one or more designated characteristics of the first remote vehicle system based on the alert status of the first remote vehicle system.

In an embodiment, a method (e.g., for controlling one or more vehicle systems traveling along a route) includes obtaining operational data from a plurality of remote vehicle systems traveling along corresponding routes based on at least two different trip plans. The operational data includes sensor measurements representing one or more designated characteristics of each remote vehicle system. The method further includes determining a respective operation status of each remote vehicle system based on the operational data relative to one or more predetermined thresholds. One of the operation statuses representing an alert status of a first remote vehicle system of the plurality of remote vehicle systems. The method includes displaying on a display the operation statuses of the remote vehicle systems, and transmitting a control signal along a bi-directional communication link to the first remote vehicle system. The control signal is configured to adjust at least one of the one or more designated characteristics of the first remote vehicle system based on the alert status operation status of the first remote vehicle system.

In an embodiment, a system (e.g., a remote control system) includes a radio frequency (RF) circuit configured to establish a plurality of bi-directional communication links with a plurality of remote vehicle systems. Each remote vehicle system is traveling along a corresponding route based on a trip plan. The system also includes a controller circuit communicatively coupled to the RF circuit. The controller circuit is configured to obtain operational data from the plurality of remote vehicle systems. The operational data includes sensor measurements representing one or more designated characteristics of the remote vehicle systems. The controller circuit is further configured to determine operation statuses of the remote vehicle systems based on the operational data relative to one or more predetermined thresholds. The one or more predetermined thresholds are associated with a defined operator specification of the plurality of remote vehicle systems or the trip plans of the plurality of remote vehicle system. At least one of the operation statuses represent an alert status of a first remote vehicle system of the plurality of remote vehicle systems. The controller circuit is further configured to display on a display the operation statuses of the plurality of remote vehicle systems, and transmit a control signal along a first bi-directional communication link of the plurality of bi-directional communication links to the first remote vehicle system. The control signal is configured to adjust at least one of the one or more designated characteristics of the first remote vehicle system based on the alert status of the first remote vehicle system.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments herein describe systems and methods to remotely operate one or more vehicle systems traversing along corresponding routes based on a trip plan.

The trip plan corresponds to a speed profile of the vehicle system traversing along the route. The speed profile includes various speeds or velocities the vehicle system is adjusted to when travelling along corresponding segments within the trip plan. While executing the trip plan, a radio frequency (RF) circuit of the vehicle system may transmit operational data along a bi-directional communication link to a remote control system. The operational data may include sensor measurement data acquired by the vehicle system, such as buff and/or draft forces of the vehicle system, speed information, proximity alerts, and/or the like.

The remote control system may be configured to receive and display the operational data to an operator separate from and/or remote to the vehicle system. For example, the remote control system is configured to provide the operator information necessary to control in-train forces when the vehicle system is in motion. Additionally or alternatively, the remote control system may be configured to generate one or more alerts configured to notify the operator to operational issues that risk the safety and/or operation of the vehicle system along the route. The remote control system is configured to receive control signals from the operator. For example, the control signals may be based and/or indicative of one or more user inputs received from a user interface. The control signals may correspond to an adjustment to one or more operations of the vehicle system. For example, the adjustments may adjust a speed of the vehicle system, activate one or more brakes of the vehicle system, and/or the like.

At least one technical effect of various embodiments described herein may include enabling remote mainline operation of a vehicle system. At least one technical effect of various embodiments described herein include reducing costs associated with re-crews by reducing the crew size of the vehicle system. At least one technical effect of various embodiment described herein include improved safety of the vehicle system by reducing shift time and fatigue of the operators. At least one technical effect of various embodiments described herein include enabling an operator to remotely control one or more vehicle system from a central office area (e.g., remote control system).

While the discussion and figures included herein may be interpreted as focusing on rail vehicle consists (e.g., trains) as the vehicle systems, it should be noted that not all embodiments of the subject matter herein described and claimed herein are limited to trains and railroad tracks. (A consist is a group of vehicles that are mechanically linked to travel together.) The inventive subject matter may apply to other vehicles, such as ships, or automobiles or the like.

Figure 1:
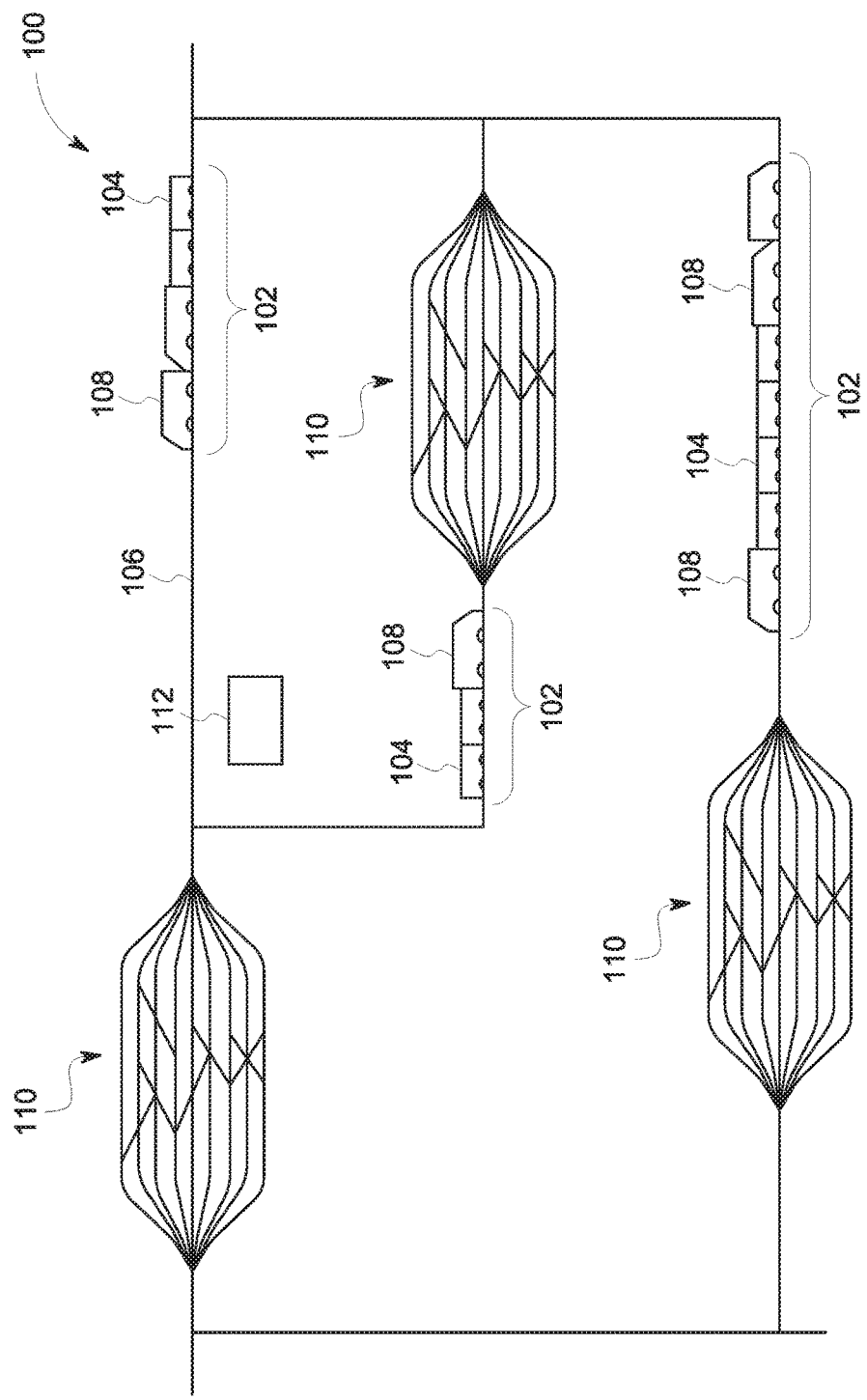
FIG. 1 is a schematic diagram of a transportation network of an embodiment.

FIG. 1 is a schematic diagram of an embodiment of a transportation network 100. The transportation network 100 includes a plurality of interconnected routes 106, such as railroad tracks, roads, ship lanes, or other paths across which a vehicle system 102 travels. The routes 106 may be referred to as main line routes when the routes 106 provide paths for the vehicle systems 102 to travel along in order to travel between a starting location and a destination location (and/or to one or more intermediate locations between the starting location and the destination location). The transportation network 100 may extend over a relatively large area, such as hundreds of square miles or kilometers of area. While only one transportation network 100 is shown in FIG. 1, one or more other transportation networks 100 may be joined with and accessible to vehicles traveling in the illustrated transportation network 100. For example, one or more of the routes 106 may extend to another transportation network 100 such that vehicles can travel between the transportation networks 100. Different transportation networks 100 may be defined by different geographic boundaries, such as different towns, cities, counties, states, groups of states, countries, continents, or the like. The number of routes 106 shown in FIG. 1 is meant to be illustrative and not limiting on embodiments of the described subject matter. Moreover, while one or more embodiments described herein relate to a transportation network formed from railroad tracks, not all embodiments are so limited. One or more embodiments may relate to transportation networks in which vehicles other than rail vehicles travel, such as roads or highways traveled by automobiles, water-borne shipping paths (e.g., shipping lanes) taken by ships, and/or the like.

Several vehicle systems 102 travel along the routes 106 within the transportation network 100 according to a trip plan. The vehicle systems 102 may concurrently travel in the transportation network 100 along the same or different routes 106. Travel of one or more vehicle systems 102 may be constrained to travel within the transportation network 100. Additionally or alternatively, one or more of the vehicle systems 102 may enter the transportation network 100 from another transportation network or leave the transportation network 100 to travel into another transportation network.

The trip plan, further described herein, instructs the vehicle system 102 on a designated route of travel through the transportation network 100, projected or planned speeds, and for scheduling information (e.g., arrival times, destination times) of the vehicle system 102 as the vehicle system 102 travels within the transportation network 100. The projected or planned speed information may be included in a speed profile of the trip plan. The trip plan may be generated by the vehicle system 102 or received by the vehicle system 102 from one or more central dispatch facilities 112. For example, the vehicle system 102 may receive and/or transmit data (e.g., operational data, trip plan) along a bi-directional communication link between the one or more central dispatch facilities 112 and the vehicle system 102. In one embodiment, the trip plan designates speeds of the vehicle system 102 as a function of time and/or distance along the route 106.

In the illustrated embodiment, three vehicle systems 102 are shown and described herein as rail vehicles or rail vehicle consists. However, one or more other embodiments may relate to vehicles other than rail vehicles or rail vehicle consists. For example, the vehicle systems can represent other off-highway vehicles (e.g., vehicles that are not designed or permitted to travel on public roadways), marine vessels, automobiles, and the like. While three vehicle systems 102 are shown in FIG. 1, alternatively, a different number of vehicle systems 102 may be concurrently traveling in the transportation network 100 (e.g., more than three, less than three).

Additionally or alternatively, the vehicle system 102 may include one or more propulsion generating vehicles (PGV) 108 (e.g., locomotives or other vehicles capable of self-propulsion) and/or one or more cargo-carrying vehicles (CCV) 104. The CCV 104 is a non-propulsion-generating vehicle, such as cargo cars, passenger cars, or other vehicles incapable of self-propulsion. In at least one embodiment, the PGV 108 and the CCV 104 are mechanically coupled or linked together to form the vehicle system 102 (e.g., a consist) to travel or move along the routes 106. The routes 106 are interconnected to permit the vehicle systems 102 to travel over various combinations of the routes 106 to move from a starting location to a destination location and/or an intermediate location there between.

The transportation network 100 may include one or more vehicle yards 110. While three vehicle yards 110 are shown, alternatively, the transportation network 100 may include a different number of vehicle yards 110. The vehicle yards 110 are located along the routes 106 in order to provide services to the vehicle systems 102, such as to repair or maintain the one or more PGV 108, re-order the sequence of vehicle systems 102 traveling along the routes 106 by adjusting an order to which the vehicle systems 102 exits the vehicle yard 110 relative to the order of the vehicle systems 102 entering vehicle yard 110, partitioning and storing the one or more PGV 108 and/or CCV 104 of the vehicle system 102, load or couple additional CCV 104 and/or PGV 108 onto the vehicle system 102, or the like.

Figure 2:
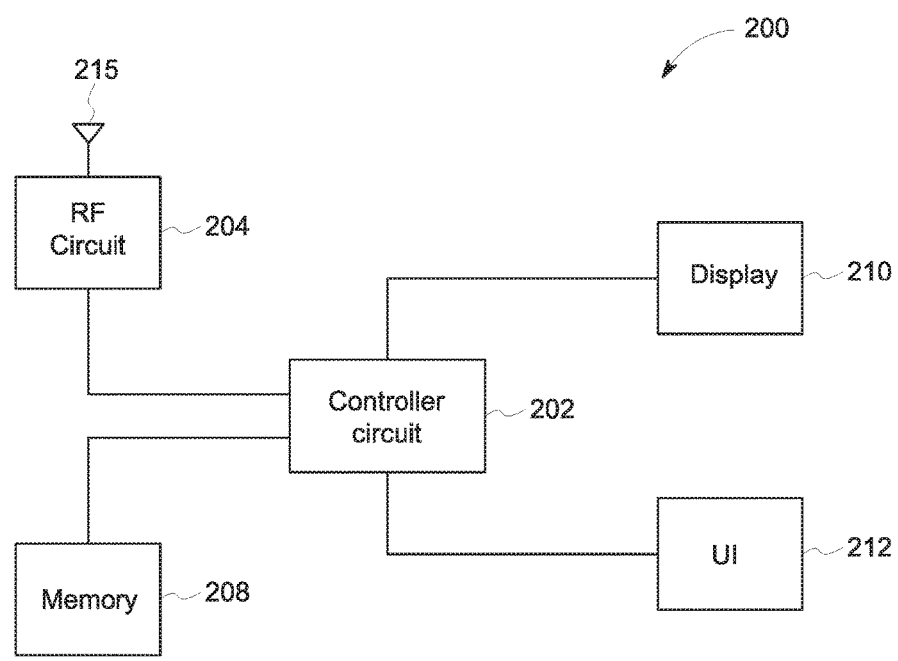
FIG. 2 is a schematic diagram of a remote control system, in accordance with an embodiment.

In connection with FIG. 2, the central dispatch facilities 112 may include one or more remote control systems 200. The remote control system 200 may be configured to provide an operator of the vehicle system 102 information necessary to control and/or operate the vehicle systems 102 while traversing within the transportation network 100.

FIG. 2 is a schematic block diagram of an embodiment of a remote control system 200. The remote control system 200 includes a controller circuit 202, a memory 208, a display 210, a user interface 212, and a radio frequency (RF) circuit 204. These components of the remote control system 200 may communicate with each other via wired and/or wireless connections. The memory 208 is an electronic storage device configured to store information received from one or more vehicle systems 102 of the transportation network 100. For example, the memory 208 may include operational data of corresponding vehicle systems 102, the memory 208 may include one or more predetermined thresholds utilized by the controller circuit 202 to determine operation statuses of the one or more vehicle system 102 based on the operational data, and/or the like.

The memory 204 may include protocol firmware that may be accessed by the controller circuit 202. The protocol firmware may provide the wireless protocol syntax for the controller circuit 202 to assemble data packets, to establish bi-directional communication links based on the wireless protocol, partition data from the data packets, and/or the like. The protocol syntax may include specifications on the structure of packets (e.g., frame size, packet specifications, appropriate number of bits, frequency, and/or the like) that are received and/or transmitted by the vehicle systems 202 and/or RF circuit 204. The memory 208 may include flash memory, RAM, ROM, EEPROM, and/or the like. The contents of the memory 208 may be accessed by the controller circuit 202, the RF circuit 204, the display 210, the user interface 212, and/or the like.

The RF circuit 204 may be configured to handle and/or manage the bi-directional communication links between the remote control system 200 and the vehicle systems 102, and/or the like. For example, the RF circuit 204 may include a receiver, a transmitter, a transceiver, and/or the like. The RF circuit 204 includes and/or is electrically coupled to an antenna 215. The RF circuit 204 is controlled by the controller circuit 202 and may support one or more wireless communication protocols. For example, the wireless communication protocols may include Bluetooth low energy, Bluetooth, ZigBee, WiFi, 802.11, and/or the like. Protocol firmware may be stored in the memory 208, which is accessed by the controller circuit 202. The protocol firmware provides the wireless protocol syntax for the controller circuit 202 to assemble data packets, establish one or more bi-directional communication links and/or partition data received from other components of the transportation network 100 and/or an alternative remote control system.

Additionally or alternatively, the remote control system 200 may be communicatively coupled to one or more vehicle systems 102 utilizing a physical medium (e.g., cable). For example, the remote control system 200 may include a communication circuit configured to establish bi-directional communication links with one or more vehicle systems 102 utilizing Ethernet, rail communication, and/or the like.

The controller circuit 202 is configured to control the operation of the remote control system 200. The controller circuit 202 is communicatively coupled to the RF circuit 204. In various embodiments, the controller circuit 202 is configured to obtain operational data of the one or more vehicle systems 102, determine operation statuses of the one or more vehicle systems 102 based on the operational data relative to one or more predetermined thresholds, and instruct the display 210 to display the operation status of the one or more vehicle systems 102. For example, the controller circuit 202 may obtain along the bi-directional communication links operational data of the one or more vehicle systems 102 traversing within the transportation network 100.

Additionally or alternatively, the controller circuit 202 is configured to generate an alert notification when the operation status of a corresponding vehicle system 102 represents an alert status. For example, the alert status may indicate potential failure of the operation of the vehicle system 102, a delay in the trip plane executed by the vehicle system 102, needed maintenance of the vehicle system 102, and/or the like. The alert notification may be configured to alert the operator of the remote control system 200. For example, the alert notification may include a graphical notification (e.g., graphical icon, animation) shown on the display 210, an auditory alert, a pop-up graphical window shown on the display 210, continually adjusting a color of the display 210 (e.g., color coded flashes), and/or the like.

The controller circuit 202 may be embodied in hardware, such as one or more processors, controller, or other logic-based device, that performs functions or operations based on one or more sets of instructions (e.g., software). The instructions on which the hardware operates may be stored on a tangible and non-transitory (e.g., not a transient signal) computer readable storage medium, such as the memory 208. Alternatively, one or more of the sets of instructions that direct operations of the hardware may be hard-wired into the logic of the hardware.

The controller circuit 202 is operably coupled to the display 210 and the user interface 212. The display 210 may include one or more liquid crystal displays (e.g., light emitting diode (LED) backlight), organic light emitting diode (OLED) displays, plasma displays, CRT displays, and/or the like. The display 210 may display one or more operation statuses corresponding to one or more vehicle systems 102 traversing within the transportation network 100. Optionally, the display 210 may include a position of the corresponding one or more vehicle systems 102 relative to the trip plans executed by the vehicle systems 102.

The user interface 212 is configured to control operations of the controller circuit 202 and is configured to receive inputs from the operator. The user interface 212 may include a keyboard, a mouse, a touchpad, one or more physical buttons, and/or the like.

Based on the received inputs from the operator, the controller circuit 202 may be configured to generate one or more control signals to the vehicle systems 102. The one or more control signals may be configured to adjust a speed of the vehicle system 102, adjust the trip plan of the vehicle system 102 (e.g., destination, schedule, speed profile, and/or the like), schedule maintenance of the vehicle system 102, and/or the like.

Additionally or alternatively, the display 210 may be a touch screen display, which includes at least a portion of the user interface 212. For example, a portion of the user interface 212 may correspond to a graphical user interface (GUI), such as the GUI 300 shown in FIG. 3, generated by the controller circuit 202, which is shown on the display 210. The GUI may include one or more interface components that may be selected, manipulated, and/or activated by the user operating the user interface 212 (e.g., touch screen, keyboard, mouse). The interface components may be presented in varying shapes and colors, such as a graphical or selectable icons, a slide bar, a cursor, and/or the like. Optionally, one or more interface components may include text or symbols, such as a drop-down menu, a toolbar, a menu bar, a title bar, a window (e.g., a pop-up window) and/or the like. Additionally or alternatively, one or more interface components may indicate areas within the GUI for entering or editing information (e.g., vehicle system 102 information, adjusting one or more of the predetermined threshold, entering control signals), such as a text box, a text field, and/or the like.

Figure 3:
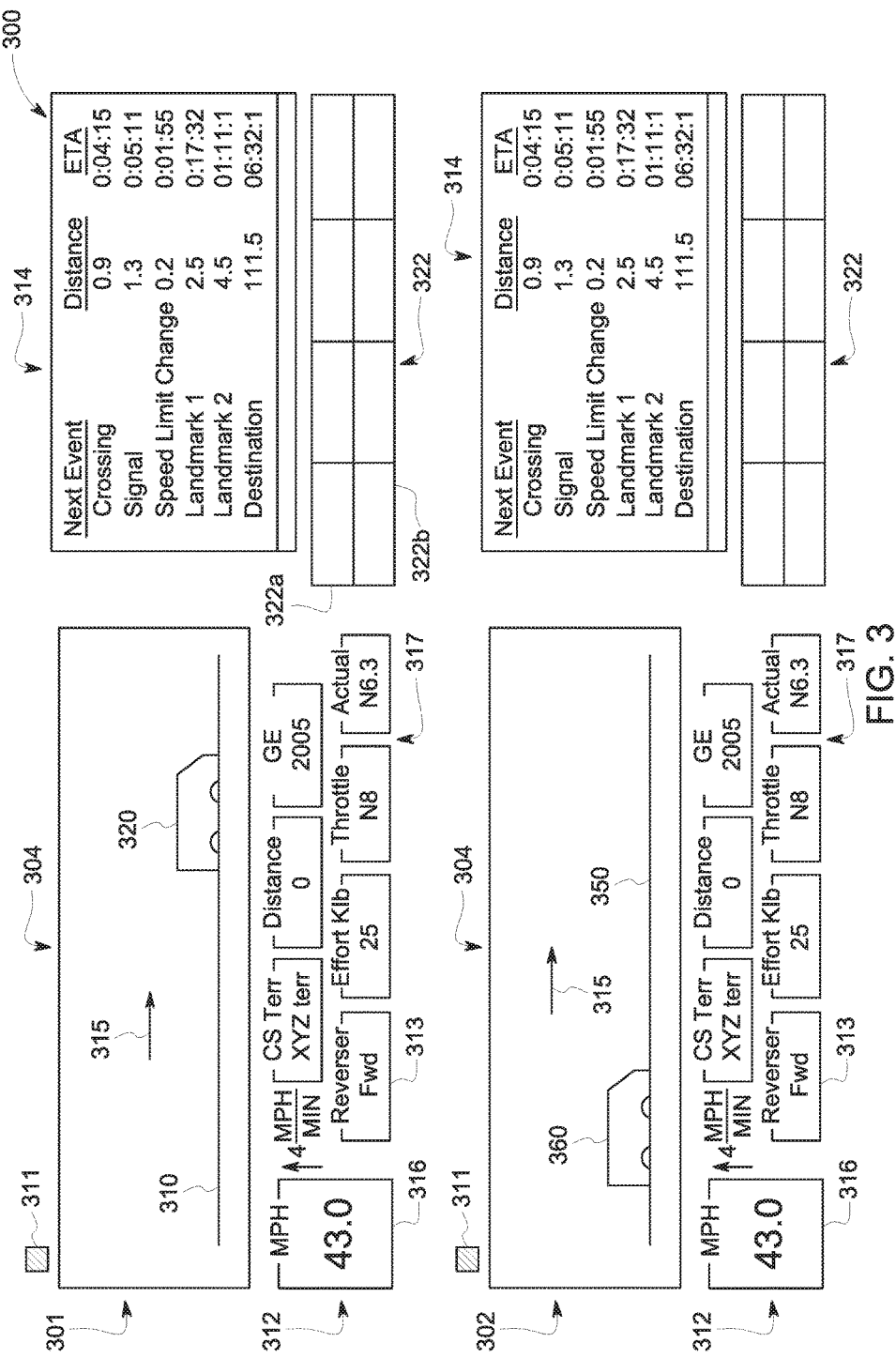
FIG. 3 is an illustration of a graphical user interface of an embodiment shown on a display of the remote control system shown in FIG. 2.

FIG. 3 is an illustration of a GUI 300 of an embodiment shown on the display 210 of the remote control system 200. The GUI 300 is subdivided into vehicle sections 301 and 302 representing a corresponding vehicle systems 102 operated by the remote control system 200. For example, the GUI 300 is shown operating two vehicle systems 102. It may be noted in various other embodiments, the remote control system 200 may be operating more than two vehicle systems 102 and/or less than two vehicle systems 102 (e.g., one vehicle system 102). Each vehicle section 301 and 302 may include a plurality of interface components. For example, the interface component 312 may be configured to indicate operational information of the vehicle system 102 received by the remote control system 200. The operational information shown in the interface component 312 may include speed information 316, drive information 313, throttle information 317, and/or the like. It may be noted in various embodiments the operational information shown in the interface component 312 may include configuration information of the vehicle system 102 (e.g., orientation of PGV 108 within the vehicle system 102), model information (e.g., of the PGV 108), in-train forces of the train (e.g., run-in force information, run-out force information), and/or the like.

The interface component 304 may indicate a position of the vehicle system 102 relative to the trip plan executed by the vehicle system 102. For example, the interface component 304 includes a graphical icon 320, 360 representative of the vehicle system 102, and a route 310, 350 of directed by the tip plan. Based on a position of the graphical icons 320, 360 relative to the routes 310, 350 along a direction of the arrows 315 the operator may determine a progress of the vehicle system 102 of the trip plan. For example, a position of the graphical icon 320 being further along the route 310 in the direction of the arrow 315 indicates that the vehicle system 102 represented by the graphical icon 320 is further along the trip plan relative to the vehicle system represented by the graphical icon 360. It may be noted that the interface component 304 may include additional information of the trip plane executed by the vehicle system 102. For example, the interface component 305 may include speed profile information, grade information, and/or the like. Optionally, the route 310, 350 may represent the grade of the designated route. For example, as the grade of the designated route increases the route 310, 350 may have a positive slope towards an upper portion of the interface component 304. Alternatively, as the grade of the designated route decreases the route 310, 350 may have a negative slope towards a lower portion of the interface component 304.

The interface component 311 may represent the operation status of the vehicle system 102 represented by the graphical icon 320, 360 determined by the controller circuit 202. One or more characteristics of the interface component 311 may be adjusted based on the operation status of the vehicle system 102. For example, a select color of the interface component 311 may represent the operation status of the vehicle system 102.

The interface component 314 may include information of the trip plan executed by the corresponding vehicle system 102. For example, the interface component 314 may include information pertaining to distance and/or estimated time of arrival to such locations as crossings, signals, speed changes, landmarks, destinations 120, and/or the like.

The GUI 300 includes a series of interface components 322 that may represent one or more control signals the operator may select and/or activate to adjust an operation of the vehicle system 102. For example, the interface components 322a-b may represent control signals to increase a speed of the vehicle system (e.g., the interface component 322a) or decrease a speed of the vehicle system 102 (e.g., the interface component 322b). In another example, the operator may select one or more of the interface components 322 to adjust one or more of the speed profiles within the trip plan executed by the vehicle system 102. The controller circuit 508 may detect when one of the interface components 322 are selected and/or activated by the operator via the user interface 212, and generate one or more control signals corresponding to the selected interface component to the vehicle system 102.

Figure 4:
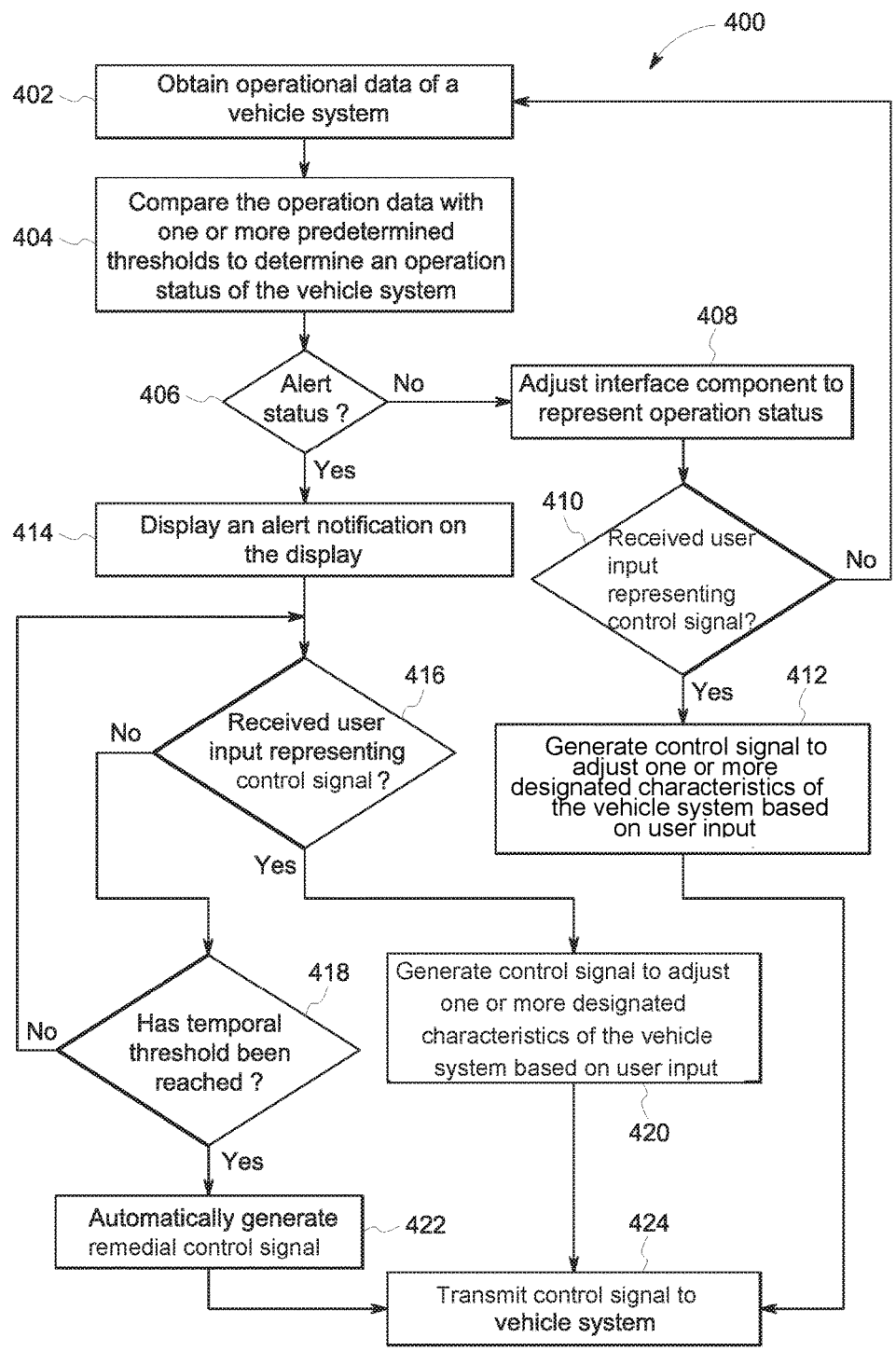
FIG. 4 is a flowchart of an embodiment of a method for controlling one or more vehicle systems traveling along a route.

FIG. 4 flowchart of an embodiment of a method 400 for controlling one or more vehicle systems 102 traveling along a route. The method 400, for example, may employ or be performed by structures or aspects of various embodiments (e.g., the controller circuit 202, the RF circuit 204, and/or the like) discussed herein. In various embodiments, certain operations may be omitted or added, certain operations may be combined, certain operations may be performed simultaneously, certain operations may be performed concurrently, certain operations may be split into multiple operations, certain operations may be performed in a different order, or certain operations or series of operations may be re-performed in an iterative fashion. For example, although the method 400 identifies a single vehicle system 102 in various embodiments the method 400 may be re-performed concurrently for a plurality of vehicle systems 102 traversing within the transportation network 100. In various embodiments, portions, aspects, and/or variations of the method 400 may be able to be used as one or more algorithms to direct hardware to perform one or more operations described herein.

Beginning at 402, the controller circuit 202 may obtain operational data of a vehicle system, such as one of the vehicle systems 102 shown in FIG. 1. For example, in connection with FIG. 5, the controller circuit 202 may receive the operational data along a bi-directional communication link established between the RF circuit 204 of the remote control system 200 and a communication subsystem 502 of the vehicle system 102.

Figure 5:
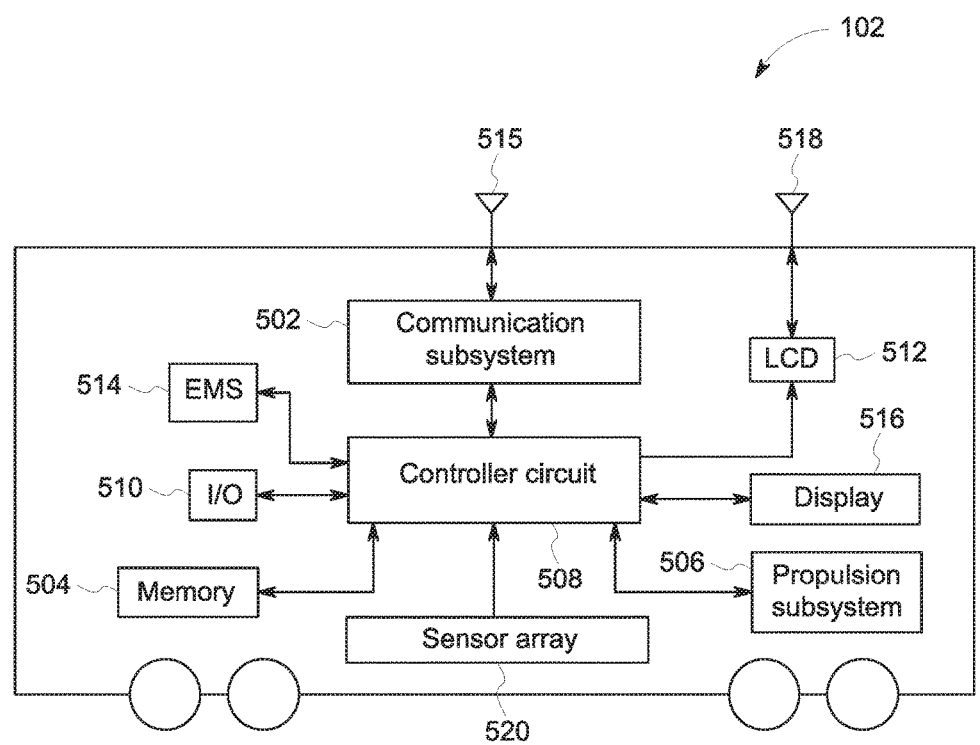
FIG. 5 is a schematic block diagram of an embodiment of a vehicle system.

FIG. 5 is a schematic diagram of an embodiment of the vehicle system 102. It may be noted that although FIG. 5 illustrates the vehicle system 102 as a single propulsion-generating vehicle (e.g., PGV 108 shown in FIG. 1), in other embodiments the vehicle system 102 may include more than one PGV 108 and/or one or more non-propulsion vehicles (e.g., CCV 104). The vehicle system 102 includes the communication subsystem 502, a memory 504, a propulsion subsystem 506, a controller circuit 508, an input/output (I/O) device 510, a display 516, an energy management subsystem 514, a sensor array 520, and a location determining circuit 512. The components of the vehicle system 102 may communicate with each other via wired and/or wireless connections. Additionally or alternatively, the vehicle system 102 may include one or more components in addition to the listed components and/or one or more of the listed components may be included on a different vehicle that is communicatively coupled to the vehicle system 102.

The communication subsystem 502 includes an antenna 515 that is electrically coupled to a transceiver or a separate transmitter and receiver. The communication subsystem 502 is configured to wirelessly communicate, bi-directionally, with off-board locations, such as the remote control system 200. For example, the communication subsystem 502 may be used to receive and/or adjust the trip plan, control signals to adjust the operation (e.g., speed, tractive effort, and/or the like), and/or the like from the remote control system 200.

The memory device 504 is an electronic storage device configured to store trip data, for example, the trip plan, speed profile, location information, and/or the like. Optionally, the memory device 504 may be configured to store route 106 information of the transportation network 100, such as, speed limits within the transportation network 100, grade information of various segments of routes 106, emission limits, traffic information received by the communication subsystem 502 and/or the like. The contents of the memory device 504 may be accessed by the controller circuit 508, a user via the I/O device 510, the communication subsystem 514, the energy management subsystem 514, and/or the like.

The propulsion subsystem 506 is configured to provide tractive efforts to propel the vehicle system 102 along the route 106. The propulsion subsystem 506 may include one or more engines and/or motors, wheels, fins, or treads that engage the track material, and also a fuel or power source that energizes the engines and/or motors. The propulsion subsystem 506 may be associated with a braking subsystem (not shown) that is configured to slow movement of the vehicle system 102 and/or prohibit movement of the vehicle system 102 completely when actuated.

The I/O device 510 is configured to receive input information from one or more user devices from an operator on board the vehicle system 102, such as a keyboard, a mouse, a hand-held device (e.g., cell phone, tablet, PDA, etc.), touchscreen, and/or a graphical user interface of the display 516. The I/O device 510 is configured to transmit the input information to the controller circuit 508 for processing.

The display 516 may display trip plan information, the speed profile, charts, graphs, and/or other indicia for the user of the vehicle system 102. Additionally or alternatively, the display 516 may display a graphical icon to indicate when a bi-directional communication link is formed with the remote control system 200. For example, the display 516 may display the planned or predicted speed of the vehicle system 102 for various segments of the designated route of the trip plan. The display 516 may be an LCD (liquid crystal display), plasma display, CRT monitor, and/or the like. Optionally, the display 516 may include a touch sensitive surface (e.g., sensor or set of sensors that accepts input from a user based on haptic and/or tactile contact), which may be used as a part of the I/O device 510.

The location determining circuit 512 is configured to track the movement of the vehicle system 102 along the route 106. For example, the location determining circuit 512 may include a receiver, antenna 518, and associated circuitry for receiving wireless signals representative of the location, speed, and/or heading of the vehicle system 102. The location determining circuit 512 may use global positioning system technology (GPS) to communicate with orbiting GPS satellites. The location determining circuit 512 may compare received communications from multiple satellites to determine the location of the circuit 512. The location of the vehicle system 102 may be determined in coordinates. Additionally or alternatively, the location determining circuit 512 may communicate with external sensors or markers positioned along the route 106 to determine the location of the vehicle system 102 along the route 106. The location determining circuit 512 may include wireless transceiver hardware and circuitry to triangulate the location of the vehicle system along the route using wireless signals. Furthermore, the data from multiple sensors may be used by the location determining circuit 512 to provide a more accurate location. Optionally, the location determining circuit 512 may be used to provide a more accurate velocity or speed of the vehicle system 102 based on the change in location of the vehicle system 102 over time. The location determining circuit 512 may be used by the controller circuit 508 to determine the location of the vehicle system 102 continuously, or at various times along a trip, in order to determine the position of the vehicle system 102 relative to the trip plan.

The sensor array 520 includes a plurality of sensors configured to acquire one or more designated characteristics of the vehicle system 102. The sensor array 520 may include a temperature sensor, accelerometers, optical and/or image sensors, weather station sensors (e.g., thermometer, hygrometer, anemometer, rain gauge), auditory sensors, thermal sensors, and/or the like. The one or more designated characteristics may represent the operation of the vehicle system 102 traversing along the route 106 according to the trip plan. For example, the one or more designated characteristics may include a speed of the vehicle system 102 along the route 106, temperature of one or more engines of the propulsion subsystem 506, in-train forces (e.g., run-on, run-out) of the vehicle system 102, vertical displacement of the vehicle system 102, horizontal displacement of the vehicle system 102, proximity alerts (e.g., objects proximate to the vehicle system 102, objects (e.g., animals, snow, debris) positioned on the route 106, ambient environment information (e.g., ambient temperature, humidity, precipitation) of the vehicle system 102, and/or the like. The in-train forces are associated with run-in (e.g., compression of adjacent cars within the vehicle system 102) and run-out (e.g., extension of adjacent cars within the vehicle system 102) occurrences due to changes in speed (e.g., tractive effort) and/or braking of the vehicle system 102, changes in grade and/or undulations of the route 106, oscillation, and/or the like.

Additionally or alternatively, one or more designated characteristics may be acquired by other components of the vehicle system 102 other than the sensor array 520. For example, the one or more designated characteristics may include a vertical displacement of the vehicle system 102, speed, and/or location of the vehicle system 102 that is acquired by the location determining circuit 512.

The energy management subsystem 514, communicating with the controller circuit 508, controls operations of the propulsion subsystems 506 of the vehicle system 102 adhering to the trip plan. The energy management subsystem 514 may be embodied in hardware, such as a processor, controller, or other logic-based device, that performs functions or operations based on one or more sets of instructions (e.g., software). The instructions on which the hardware operates may be stored on a tangible and non-transitory (e.g., not a transient signal) computer readable storage medium, including one or more computer hard drives, flash drives, RAM, ROM, EEPROM, or the like. Additionally or alternatively, one or more of the sets of instructions that direct operations of the hardware may be hard-wired into the logic of the hardware. Optionally, the energy management subsystem 514 may control the propulsion subsystem 506 directly. The trip plan of the vehicle system 102 includes the travel of the vehicle system 102 along the route 106 from a starting location to a destination location. The energy management subsystem 514 can refer to the trip plan that includes information related to the vehicle system 102 (e.g., amount of tractive effort, efficiency of propulsion), the route 106, the geography over which the route 106 extends, and other information in order to control the tractive efforts of the vehicle system 102 (e.g., based on the one or more PGV 108 of the vehicle system 102).

The energy management subsystem 514 may communicate with the propulsion subsystem 506 to change the tractive effort as the vehicle system 102 travels over different segments of the designated route of the trip plan. For example, if the vehicle system 102 is approaching a steep incline and the trip profile indicates that the vehicle system 102 is carrying significantly heavy cargo, then the energy management subsystem 514 may direct the vehicle system 102 to increase the tractive efforts supplied by the propulsion subsystem 506. Conversely, if the vehicle system 102 is carrying a smaller cargo load based on the trip profile, then the energy management subsystem 514 may direct the propulsion subsystem 506 to increase the supplied tractive efforts by a smaller amount than the tractive efforts would otherwise be increased if the data indicated a heavier cargo load. The energy management subsystem 514 may notify the user of the operating actions, such as, to increase tractive effort, by displaying a message on the display 516.

The tractive efforts may be changed in response to other factors, such as changes in the route that the vehicle system 102 travels along, regulatory requirements (e.g., emission limits) of the regions through which the vehicle system 102 travels within the transportation network 100, and/or the like, based on the trip plan. For example the active efforts may be changed due to at or below allowed speeds (e.g., vehicle system 102 speed limits) while traveling along segments along the designated route The trip plan may be received by the vehicle system 102 from the communication subsystem 502 or generated by the controller circuit 508. The trip plan includes the operating parameters or orders for the vehicle system 102 executed by the energy management subsystem 514. The parameters include the tractive and braking efforts expressed as a function of one or more location of the vehicle system 102 along the route 106 of the trip plan, distance along the designated route, speed of the vehicle system 102, and/or time, as defined by the upcoming segment of the route 106. The trip plan optionally may also include additional information, such as suggested primary and secondary routes, time schedule (e.g., departure times, arrival times), energy usage, the allowed speed of a segment, and the like. In one aspect, the trip plans can designate the operational settings of the vehicle system 102 for different locations along the route 106 so that travel of a vehicle system 102 according to the trip plan causes the vehicle system 102 to consume less fuel and/or generate fewer emissions than the vehicle system 102 traveling along the same designated route with different operational settings. The trip plan may be established using an algorithm based on models for vehicle behavior for the vehicle system 102 along the designated route.

In an embodiment, the memory 504 may store a software application, executed by the controller circuit 508 and/or energy management subsystem 514, such as the Trip Optimizer™ system provided by General Electric Company, or another energy management system. For additional discussion regarding trip plans (e.g., trip profiles), see U.S. patent application Ser. No. 12/955,710, Publication No. 2012/0136515, "Communication System for a Rail Vehicle Consist and Method for Communicating with a Rail Vehicle Consist," filed 29 Nov. 2010, the entire contents of which are incorporated herein by reference. The Trip Optimizer™ system can create a trip profile that can reduce braking of the rail vehicle by learning the rail vehicle's characteristics and calculating an efficient way of running the rail vehicle by considering factors such as the length and weight of the rail vehicle, the grade of the route that the rail vehicle will be traversing, conditions of the track that the rail vehicle will be traveling along, weather conditions, and performance of the rail vehicle. During the trip, the propulsion subsystem is at least partially controlled by the Trip Optimizer™ system to propel the rail vehicle along its route according to the trip profile.

The controller circuit 508 controls the operation of the vehicle system 102. The controller circuit 508 may be embodied in hardware, such as a processor, controller, or other logic-based device, that performs functions or operations based on one or more sets of instructions (e.g., software). The instructions on which the hardware operates may be stored on a tangible and non-transitory (e.g., not a transient signal) computer readable storage medium, such as the memory 504. The memory 204 may include one or more computer hard drives, flash drives, RAM, ROM, EEPROM, or the like. Additionally or alternatively, one or more of the sets of instructions that direct operations of the hardware may be hard-wired into the logic of the hardware. The controller circuit 508 may be used in conjunction with the energy management subsystem 514 to control the propulsion subsystem 506. Optionally, the controller circuit 508 may generate a trip plan by accessing information of the transportation network 100 (e.g., speed limits within the transportation network 100, grade information of various segments of routes 106, emission limits, traffic information received by the communication subsystem 502) stored on the memory 504.

The controller circuit 508 may generate the operational data based on the sensor measurements representing one or more designated characteristics of the vehicle system 102. For example, the sensor array 520 and/or the location determining circuit 512 may acquire one or more designated characteristics of the vehicle system 102 as the vehicle system 102 is traversing along the route 106 according to the trip plan. The controller circuit 508 may receive the sensor measurements, and generate one or more data packets representing the operational data of the vehicle system 102 representing the sensor measurements. The controller circuit 508 may instruct the communication subsystem 502 to transmit the one or more data packets representing the operational data along the bi-directional communication link to the remote control system 102. The controller circuit 202 of the remote control system 102 may obtain along the bi-directional communication link the operational data via the RF circuit 204 the one or more data packets from the vehicle system 102.

At 404, the controller circuit 202 may compare the operational data with one or more predetermined threshold to determine the operation status of the vehicle system 102. For example, the controller circuit 202 may partition the operational data from the one or more data packets based on the protocol syntax stored in the memory 208. The one or more predetermined threshold may be stored in the memory 208. A portion of the one or more predetermined thresholds may represent a defined operator specification of the one or more characteristics of the vehicle system 102. The operator specification may represent a designed and/or manufacturer specification for the normal operation of the vehicle system 102 that when operating outside the specification damage of the vehicle system 102. For example, the predetermined thresholds may represent limit and/or range of temperatures of the one or more engines of the propulsion subsystem 506, in-train force limits between cars of the vehicle system 102, vertical displacement threshold (e.g., oscillation), and/or the like define the normal operation of the vehicle system 102. Optionally, a portion of the one or more predetermined threshold may be defined by the operator utilizing the user interface 212. For example, the predetermine thresholds may represent a duty cycle (e.g., life cycle) of one or more components of the vehicle system 102. Additionally or alternatively, a portion of the one or more predetermine thresholds may be based on the trip plan. For example, the predetermined thresholds may represent speed, throttle limits, and/or the like representing the trip plan of the executed by the vehicle system 102.

The controller circuit 202 may organize and/or sort the operational data based on the one or more characteristics of the vehicle system 102 based on the one or more predetermine thresholds. For example, the controller circuit 202 may organize the operational data to the corresponding one or more predetermined thresholds to determine the operation status of the vehicle system 102. Based on value of the operational data relative to the one or more predetermined thresholds may correspond to the operation status of the vehicle system 102. For example, when the one or more characteristics are below and/or within the one or more predetermine thresholds, the vehicle system 102 may be determined by the controller circuit 202 operating within the operator specifications and a corresponding "good" and/or "clear" operation status. Optionally, the operation status may be based on the predetermined threshold. For example, the operation status may correspond to "require maintenance" operation status when the designated characteristics of the vehicle system 102 corresponding to the duty cycle is above the corresponding predetermined threshold.

At 406, the controller circuit 202 may determine whether the operation status of the vehicle system 102 corresponds to an alert status. For example, when at least one of the characteristics are above and/or outside the one or more predetermined threshold, the vehicle system 102 may be determined by the controller circuit 202 operating not within the operator specification and a corresponding "defect" and/or "alert" operation status. Additionally or alternatively, at least one of the one or more predetermined thresholds may represent an alert status. For example, the one or more predetermined thresholds corresponding to designated characteristics relating to the trip plan (e.g., speed, throttle settings) and/or relating to the operator specification.

If the operation status is not an alert status, then at 408 the controller circuit 202 may adjust the interface components shown on the display 210 to represent the operation status of the vehicle system 102. For example, in connection with FIG. 3, the controller circuit 202 may adjust the interface component 311 to represent the operation status of the vehicle system 102 determined at 404.

At 410, the controller circuit 202 may determine whether a user input is received from the user interface 212 representing a control signal to the vehicle system. For example, when the controller circuit 202 detects an activation and/or selection of one of the interface components 322 (shown in FIG. 3), the controller circuit 202 may determine that a user input was received from the user interface 212.

If the control signal is received from the user interface 212, then at 412, the controller circuit 202 may generate the control signal to adjust one or more designated characteristics of the vehicle system 102 based on the user input. For example, the operator may select the interface component 322a to increase a speed of the vehicle system 102. The controller circuit 202 may detect the activation of the interface component 322a, and generate control signals in the form of a control signal data packet that includes control signal for the vehicle system 102 to increase the tractive effort (e.g., throttle setting) of the propulsion subsystem 506 to increase a speed, the designated characteristics, of the vehicle system 102.

Returning to 406, if the controller circuit 202 determines that the operation status represents an alert status, then at 414, the controller circuit 202 may generate and display an alert notification on the display 210. For example, in connection with FIG. 6, the controller circuit 202 may overlay the alert notifications 602, 604 over portions of a GUI 600.

Figure 6:
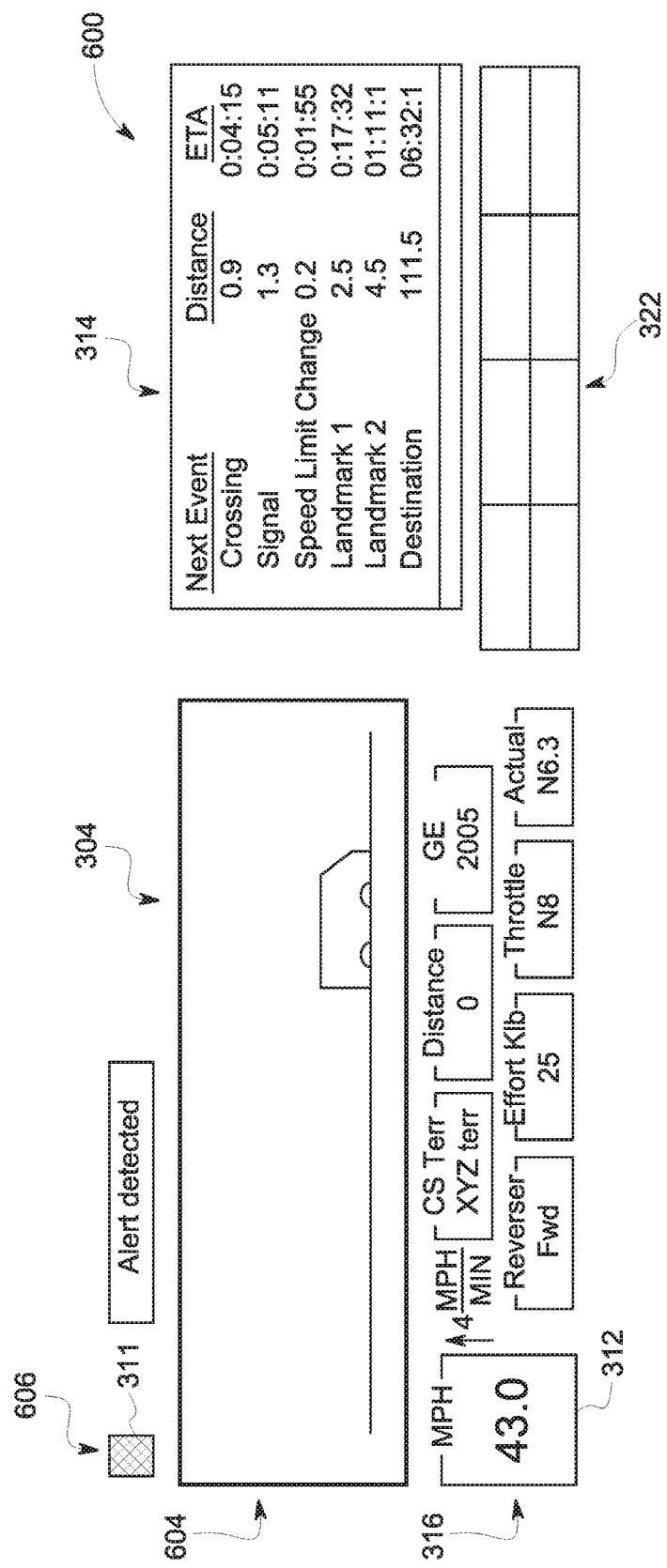
FIG. 6 is an illustration of a graphical user interface of an embodiment shown on a display of the remote control system.

FIG. 6 is an illustration of the GUI 600 of an embodiment shown on the display 210 of the remote control system 200. The controller circuit 202 has determined that the operation status of the vehicle system 102 represents an alert status. Based on the alert status, the controller circuit 202 may generate one or more alert notifications 602, 604, 606 to the GUI 600. The alert notifications 602, 604, 606 may be configured to draw attention of the operator of the remote control system 200 to the GUI 600. For example, the controller circuit 202 may adjust the interface component 311 to have a select color (e.g., red, yellow) to indicate that the alert status of the vehicle system 102. In another example, the controller circuit may overlay a graphical notification 604 around the interface component 304 to indicate the alert notification. In another example, the controller circuit 202 may include a pop-up graphical window 602 representing the alert notification. Optionally, the controller circuit 202 may include textual information describing the designated characteristic to the pop-up graphical window 602. Additionally or alternatively, the controller circuit 202 may animate and/or flash the alert notifications 602, 604, 606 shown on the GUI 600. It may be noted the controller circuit 202 may generate an alert notification to indicate the designated characteristic corresponding to the alert status. For example, the alert status may be based on a speed of the vehicle system 102 over a predetermined threshold based on the tip plane. The controller circuit 202 may adjust a color and/or add a graphical notification (e.g., similar to the graphical notification 604) to the speed information 316 of the interface component 312.

At 416, the controller circuit 202 may determine whether a user input is received from the user interface 212 representing a control signal to the vehicle system. For example, when the controller circuit 202 detects an activation and/or selection of one of the interface components 322 (shown in FIG. 6), the controller circuit 202 may determine that a user input was received from the user interface 212.

If the control signal is received from the user interface 212, then at 420, the controller circuit 202 may generate the control signal to adjust one or more designated characteristics of the vehicle system 102 based on the user input. For example, the controller circuit may generate the control signal similar to and/or the same as the control signal generated at 410.

If the control signal is not received from the user interface 212, then at 418, the controller circuit 202 may determine whether a temporal action threshold been reached. The temporal action threshold may represent a length and/or period of time the alert notification is displayed on the display 210 and/or GUI 600. For example, the temporal action threshold may be a predetermined length of time stored in the memory 208. Additionally or alternatively, the length of the temporal action threshold may be based on the designated characteristic corresponding to the alert notification, such as based on potential damage caused to the vehicle system 102 based on the designated characteristic. For example, the alert notification based on the designated characteristic corresponding to the defined operator specification (e.g., temperatures of the one or more engines of the propulsion subsystem 506, in-train force limits between cars of the vehicle system 102, and/or the like) may have a shorter temporal action threshold relative to a temporal action threshold corresponding to the designated characteristic based on the trip plan. Optionally, the length of the temporal action threshold may be based on the designated characteristic relative to the one or more predetermined thresholds corresponding to the alert status.

If the temporal action threshold has been reached, then at 422, the controller circuit 202 may automatically generate a remedial control signal. For example, if the alert notification has been displayed for the length of time corresponding to the temporal action threshold, the controller circuit 202 is configured to automatically generate one or more remedial control signals. A plurality of remedial control signal may be stored in the memory 208, each having corresponding designated characteristics. The remedial control signals may be configured to adjust the one or more designated characteristics of the vehicle system 102 to resolve the alert status. For example, the alert status may be based on a run-in force measured by the sensor array 520 over the predetermined threshold. The controller circuit 202 may match the designated characteristic with a corresponding remedial control signal stored in the memory 208. Additionally or alternatively, the controller circuit 202 may transmit the alert notification to an alternative remote controller system and/or dispatch facility.

At 424, the controller circuit 202 may transmit the control signal (e.g., generated at 412, 420, 422) to the vehicle system 102 along the bi-directional communication link. For example, the controller circuit 202 may form a control signal data packet that includes the control signal (e.g., the control signal at 412, 420, the remedial control signal at 422) to adjust one or more characteristics of the vehicle system 102. The controller circuit 202 may instruct the RF circuit 204 to transmit the control signal data packet representing the control signal along the bi-directional communication link to the vehicle system 102. The controller circuit 508 of the vehicle system 102 may receive the control signal along the bi-directional communication link via the communication subsystem 502, and adjust operation of the vehicle system 102 based on the control signal.

In an embodiment a system (e.g., a remote control system) is provided. The system includes a radio frequency (RF) circuit configured to establish a plurality of bi-directional communication links with a plurality of remote vehicle systems. Each remote vehicle system is traveling along a corresponding route based on a trip plan. The system also includes a controller circuit communicatively coupled to the RF circuit. The controller circuit is configured to obtain operational data from the plurality of remote vehicle systems. The operational data includes sensor measurements representing one or more designated characteristics of the remote vehicle systems. The controller circuit is further configured to determine operation statuses of the remote vehicle systems based on the operational data relative to one or more predetermined thresholds. At least one of the operation statuses represent an alert status of a first remote vehicle system of the plurality of remote vehicle systems. The controller circuit is further configured to display on a display the operation statuses of the plurality of remote vehicle systems, transmit a control signal along a first bi-directional communication link of the plurality of bi-directional communication links to the first remote vehicle system. The control signal is configured to adjust at least one of the one or more designated characteristics of the first remote vehicle system based on the alert status of the first remote vehicle system.

Optionally, the one or more predetermined thresholds are associated with a defined operator specification of the plurality of remote vehicle systems or the trip plans of the plurality of remote vehicle systems.

Optionally, the system includes a user interface. The controller circuit may be configured to receive a user input indicative of the control signal from the user interface.

Optionally, the controller circuit is configured to display an alert notification when the alert status is determined. Additionally or alternatively, the alert notification includes a graphical notification, an auditory alert, an animation, a pop-up graphical window, or continually adjusting a color of the display. Additionally or alternatively, the controller circuit is configured to determine when the alert notification has been displayed longer than a temporal action threshold, and automatically generate the control signal for the first remote vehicle system. Additionally or alternatively, the controller circuit is configured to transmit the alert notification to an alternative remote control system.

Optionally, the control signal further adjusts the trip plan of the first remote vehicle system.

Optionally, the display operation includes displaying positions of the remote vehicle systems relative to the corresponding routes.

In an embodiment a method (e.g., for controlling one or more vehicle systems traveling along a route) is provided. The method includes obtaining operational data from a plurality of remote vehicle systems traveling along corresponding routes based on at least two different trip plans. The operational data includes sensor measurements representing one or more designated characteristics of each remote vehicle system. The method further includes determining a respective operation status of each remote vehicle system based on the operational data relative to one or more predetermined thresholds. One of the operation statuses representing an alert status of a first remote vehicle system of the plurality of remote vehicle systems. The method includes displaying on a display the operation statuses of the remote vehicle systems, and transmitting a control signal along a bi-directional communication link to the first remote vehicle system. The control signal is configured to adjust at least one of the one or more designated characteristics of the first remote vehicle system based on the alert status operation status of the first remote vehicle system.

Optionally, the one or more predetermined thresholds are associated with a defined operator specification of the plurality of remote vehicle systems or the trip plans of the plurality of remote vehicle system.

Optionally, the method includes receiving a user input from a user interface representing the control signal.

Optionally, the display operation includes displaying positions of the remote vehicle systems relative to the corresponding routes.

Optionally, the display operation includes displaying an alert notification when the alert status is determined. Additionally or alternatively, the alert notification includes a graphical notification, an auditory alert, an animation, a pop-up graphical window, or continually adjusting a color of the display. Additionally or alternatively, the method includes determining when the alert notification has been displayed longer than a temporal action threshold, and automatically generating the control signal for the first remote vehicle system. Additionally or alternatively, the method includes transmitting the alert notification to an alternative remote control system.

Optionally, the control signal further adjusts the trip plan of the first remote vehicle system In an embodiment a system (e.g., a remote control system) is provided. The system includes a radio frequency (RF) circuit configured to establish a plurality of bi-directional communication links with a plurality of remote vehicle systems. Each remote vehicle system is traveling along a corresponding route based on a trip plan. The system also includes a controller circuit communicatively coupled to the RF circuit. The controller circuit is configured to obtain operational data from the plurality of remote vehicle systems. The operational data includes sensor measurements representing one or more designated characteristics of the remote vehicle systems. The controller circuit is further configured to determine operation statuses of the remote vehicle systems based on the operational data relative to one or more predetermined thresholds. The one or more predetermined thresholds are associated with a defined operator specification of the plurality of remote vehicle systems or the trip plans of the plurality of remote vehicle system. At least one of the operation statuses represent an alert status of a first remote vehicle system of the plurality of remote vehicle systems. The controller circuit is further configured to display on a display the operation statuses of the plurality of remote vehicle systems, and transmit a control signal along a first bi-directional communication link of the plurality of bi-directional communication links to the first remote vehicle system. The control signal is configured to adjust at least one of the one or more designated characteristics of the first remote vehicle system based on the alert status of the first remote vehicle system.

Optionally, the system includes a user interface. The controller circuit may be configured to receive a user input indicative of the control signal from the user interface.

As used herein, the terms "module," "system," "device," "circuit," or "unit," may include a hardware and/or software system and circuitry that operates to perform one or more functions. For example, a module, unit, device, circuit, or system may include a computer processor, controller, or other logic-based device that performs operations based on instructions stored on a tangible and non-transitory computer readable storage medium, such as a computer memory. Alternatively, a module, unit, device, circuit, or system may include a hard-wired device that performs operations based on hard-wired logic and circuitry of the device. The modules, units, or systems shown in the attached figures may represent the hardware and circuitry that operates based on software or hardwired instructions, the software that directs hardware to perform the operations, or a combination thereof. The modules, systems, devices, circuit, or units can include or represent hardware circuits or circuitry that include and/or are connected with one or more processors, such as one or computer microprocessors.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, or the like). Similarly, the programs may be stand alone programs, may be incorporated as subroutines in an operating system, may be functions in an installed software package, or the like. The various embodiments are not limited to the arrangements and instrumentality shown in the drawings.

As used herein, an element or step recited in the singular and proceeded with the word "a" or "an" should be understood as not excluding plural of said elements or operations, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A system comprising:
a radio frequency (RF) circuit configured to establish a plurality of bi-directional communication links with a plurality of remote vehicle systems, each remote vehicle system is traveling along a corresponding route based on a trip plan; and
a controller circuit communicatively coupled to the RF circuit, the controller circuit is configured to:
obtain operational data from the plurality of remote vehicle systems, wherein the operational data includes sensor measurements representing one or more designated characteristics of the remote vehicle systems;
determine operation statuses of the remote vehicle systems based on the operational data relative to one or more predetermined thresholds, wherein at least one of the operation statuses represent an alert status of a first remote vehicle system of the plurality of remote vehicle systems;
display on a display the operation statuses of the plurality of remote vehicle systems; and
transmit a control signal along a first bi-directional communication link of the plurality of bi-directional communication links to the first remote vehicle system, wherein the control signal is configured to adjust at least one of the one or more designated characteristics of the first remote vehicle system based on the alert status of the first remote vehicle system.

2. The system of claim 1, wherein the one or more predetermined thresholds are associated with a defined operator specification of the plurality of remote vehicle systems or the trip plans of the plurality of remote vehicle systems.

3. The system of claim 1, further comprising a user interface, wherein the controller circuit is configured to receive a user input indicative of the control signal from the user interface.

4. The system of claim 1, wherein the controller circuit is configured to display an alert notification when the alert status is determined.

5. The system of claim 4, wherein the alert notification includes a graphical notification, an auditory alert, an animation, a pop-up graphical window, or continually adjusting a color of the display.

6. The system of claim 4, wherein the controller circuit is configured to determine when the alert notification has been displayed longer than a temporal action threshold, and automatically generate the control signal for the first remote vehicle system.

7. The system of claim 6, wherein the controller circuit is configured to transmit the alert notification to an alternative remote control system.

8. The system of claim 1, wherein the control signal further adjusts the trip plan of the first remote vehicle system.

9. The system of claim 1, wherein the display operation includes displaying positions of the remote vehicle systems relative to the corresponding routes.

10. A method comprising:
obtaining operational data from a plurality of remote vehicle systems traveling along corresponding routes based on at least two different trip plans, wherein the operational data includes sensor measurements representing one or more designated characteristics of each remote vehicle system;
determining a respective operation status of each remote vehicle system based on the operational data relative to one or more predetermined thresholds, wherein one of the operation statuses represents an alert status of a first remote vehicle system of the plurality of remote vehicle systems;
displaying on a display the operation statuses of the remote vehicle systems; and
transmitting a control signal along a bi-directional communication link to the first remote vehicle system, wherein the control signal is configured to adjust at least one of the one or more designated characteristics of the first remote vehicle system based on the alert status operation status of the first remote vehicle system.

11. The method of claim 10, wherein the one or more predetermined thresholds are associated with a defined operator specification of the plurality of remote vehicle systems or the trip plans of the plurality of remote vehicle system.

12. The method of claim 10, further comprising receiving a user input from a user interface representing the control signal.

13. The method of claim 10, wherein the display operation includes displaying positions of the remote vehicle systems relative to the corresponding routes.

14. The method of claim 10, wherein the display operation includes displaying an alert notification when the alert status is determined.

15. The method of claim 14, wherein the alert notification includes a graphical notification, an auditory alert, an animation, a pop-up graphical window, or continually adjusting a color of the display.

16. The method of claim 14, further comprising determining when the alert notification has been displayed longer than a temporal action threshold, and automatically generating the control signal for the first remote vehicle system.

17. The method of claim 16, further comprising transmitting the alert notification to an alternative remote control system.

18. The method of claim 10, wherein the control signal further adjusts the trip plan of the first remote vehicle system.

19. A system comprising:
a radio frequency (RF) circuit configured to establish a plurality of bi-directional communication links with a plurality of remote vehicle systems, each remote vehicle system is traveling along a corresponding route based on a trip plan; and a controller circuit communicatively coupled to the RF circuit, the controller circuit is configured to:

obtain operational data from the plurality of remote vehicle systems, wherein the operational data includes sensor measurements representing one or more designated characteristics of the remote vehicle systems;

determine operation statuses of the remote vehicle systems based on the operational data relative to one or more predetermined thresholds, wherein the one or more predetermined thresholds are associated with a defined operator specification of the plurality of remote vehicle systems or the trip plans of the plurality of remote vehicle system, at least one of the operation statuses represent an alert status of a first remote vehicle system of the plurality of remote vehicle systems;

display on a display the operation statuses of the plurality of remote vehicle systems; and transmit a control signal along a first bi-directional communication link of the plurality of bi-directional communication links to the first remote vehicle system, wherein the control signal is configured to adjust at least one of the one or more designated characteristics of the first remote vehicle system based on the alert status of the first remote vehicle system.

20. The system of claim 19, further comprising a user interface, wherein the controller circuit is configured to receive a user input indicative of the control signal from the user interface.

\* \* \* \* \*